Figure 1:
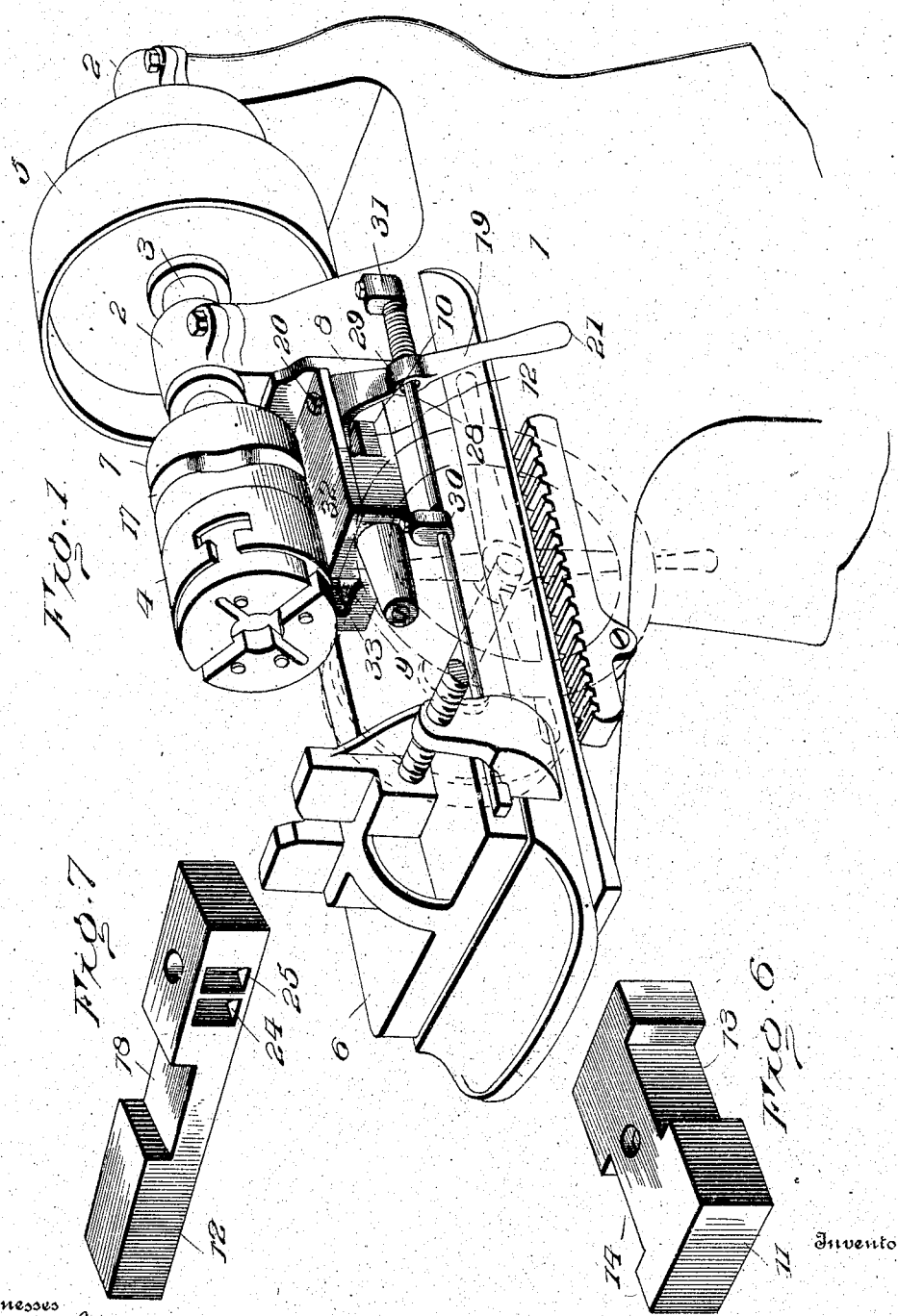

No. 786,382. PATENTED APR. 11, 1905.
F. H. EASBY.
MECHANICAL MOVEMENT FOR CONTROLLING THREADING DIES.
APPLICATION FILED OCT. 3, 1904.

3 SHEETS—SHEET 2.

Witnesses
Inventor
F. H. Easby
By Stewart & Stewart
Attorneys

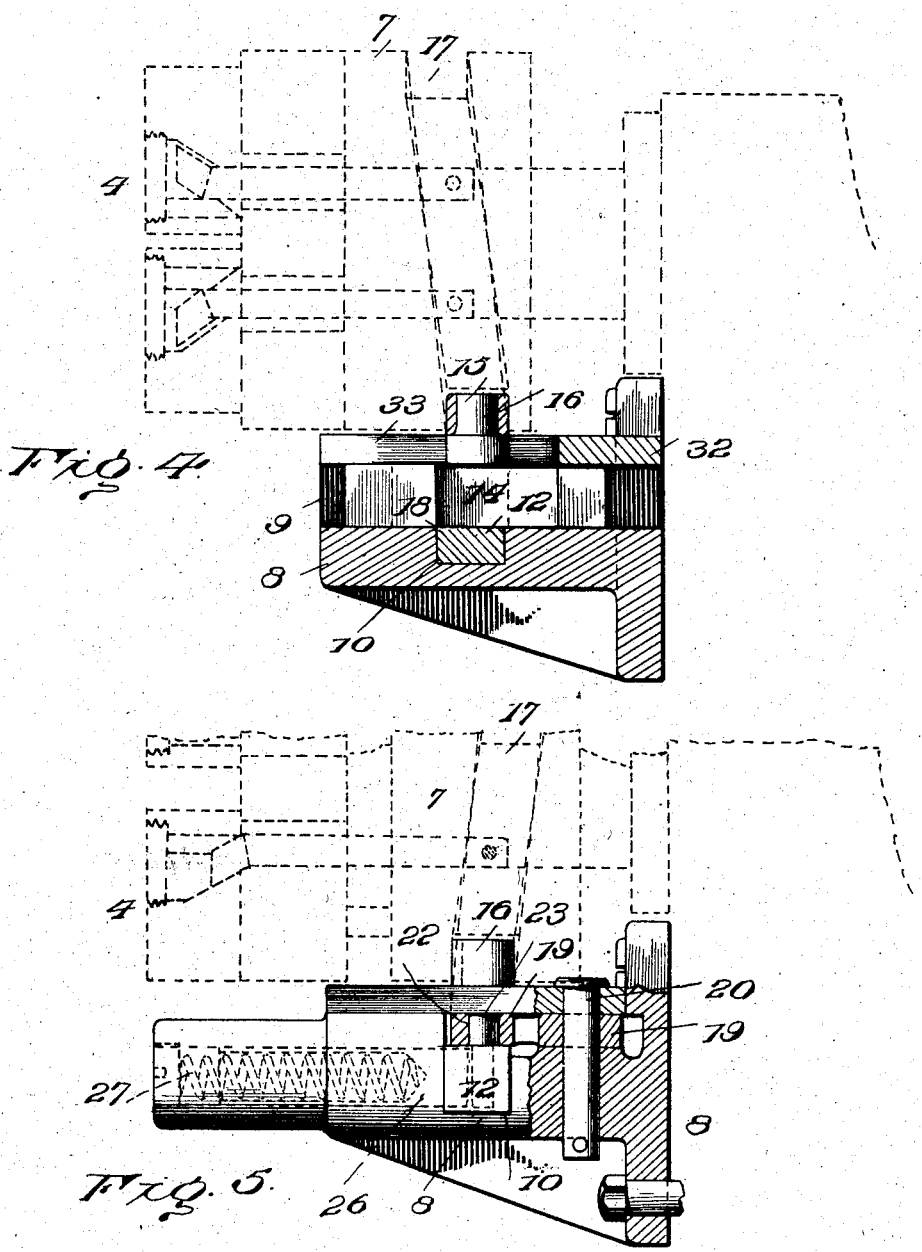

No. 786,882. Patented April 11, 1905.

UNITED STATES PATENT OFFICE.

FRANCIS H. EASBY, OF BALTIMORE, MARYLAND, ASSIGNOR TO THE DETRICK AND HARVEY MACHINE COMPANY OF BALTIMORE CITY, OF BALTIMORE, MARYLAND, A CORPORATION OF MARYLAND.

MECHANICAL MOVEMENT FOR CONTROLLING THREADING-DIES.

SPECIFICATION forming part of Letters Patent No. 786,882, dated April 11, 1905.

Application filed October 3, 1904. Serial No. 227,175.

*To all whom it may concern:*

Be it known that I, FRANCIS H. EASBY, a citizen of the United States of America, and a resident of the city of Baltimore, State of Maryland, have invented certain new and useful Improvements in Mechanical Movements for Controlling Threading-Dies, of which the following is a specification.

My invention relates to certain new and useful improvements in mechanical movements; and the object of my invention is to provide a means for imparting to a moving part a movement at an angle to its normal motion, the power for such motion being obtained from the moving part itself and the times of such motion at an angle to its normal motion being intermittent and determined in any suitable way.

In the drawings accompanying this application I have illustrated my invention as adapted for use in connection with the head of a machine for cutting threads on bolts or the like, and for the sake of illustration I have shown the device as attached to a machine of the type shown in the patent to Adams, No. 357,300, patented February 8, 1887. In machines of this class it is desirable that the thread-cutting dies carried by the head be opened either by the action of the machine automatically or by the operator at any time without stopping the rotation of the head, and this I effect by the mechanism described and claimed in this application.

While I have shown my invention as adapted to operate the dies of a thread-cutting machine, I desire to have it understood that my invention is not to be limited to such use and that I only show it in connection with a thread-cutting machine for the purpose of illustrating an application of one form of the invention.

Figure 2:
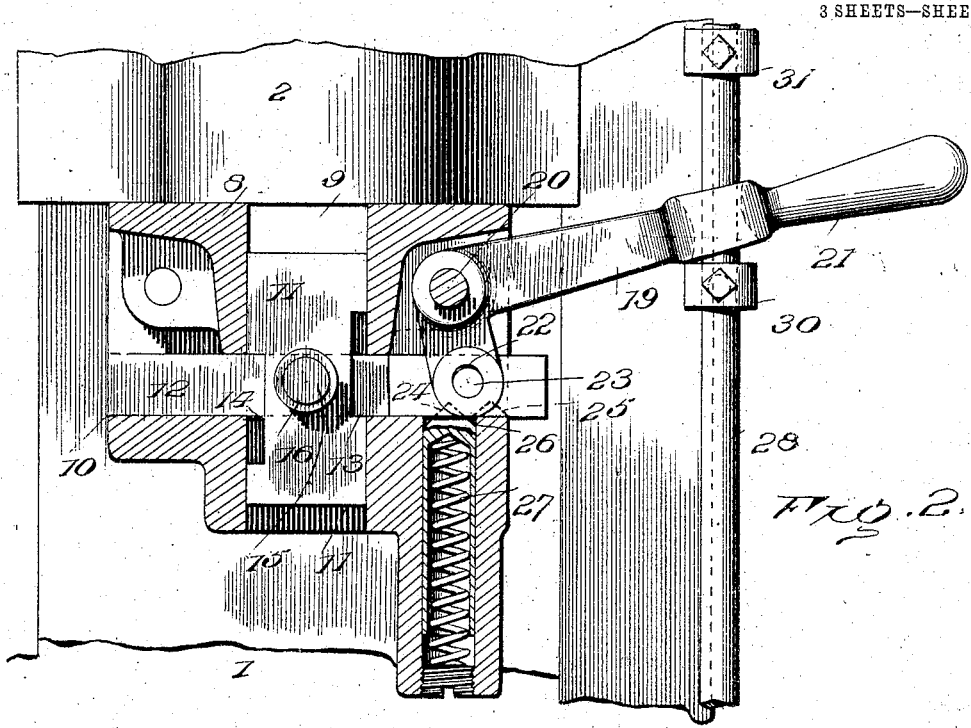
Figure 3:
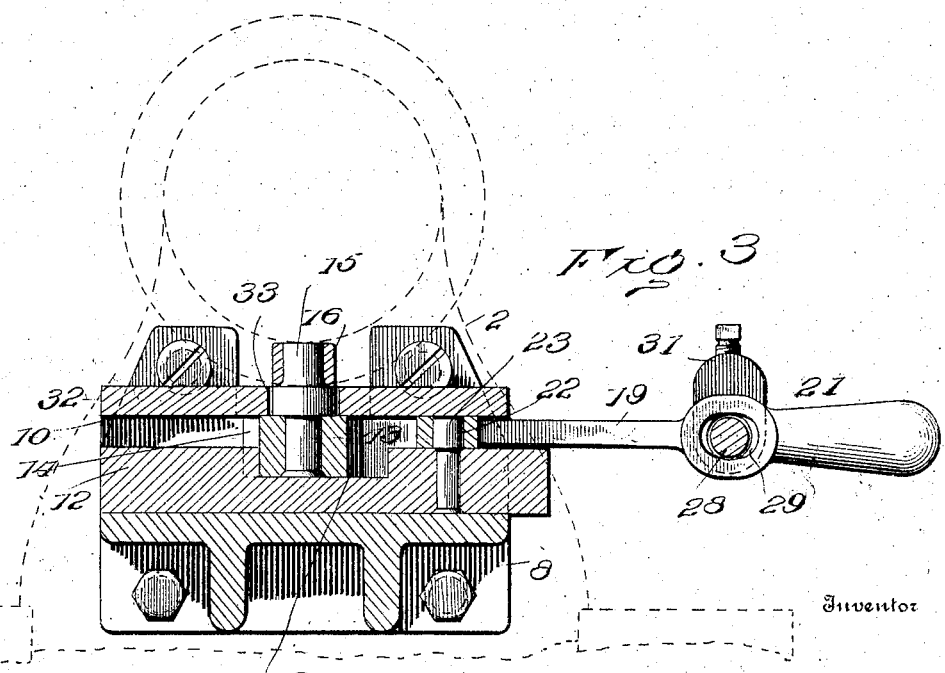

Referring to the drawings, wherein the same part is designated by the same reference-numeral wherever it occurs, Figure 1 is a perspective view of a thread-cutting machine with my invention applied thereto, the machine being of the type shown in the patent to Adams above referred to. Fig. 2 is a sectional view taken in the plane parallel to the bed of the machine shown in Fig. 1 and showing the mechanism by which the opening and closing of the head is effected. Fig. 3 is a sectional view taken at right angles to Fig. 2. Figs. 4 and 5 are detailed side elevations, partly in section. Fig. 6 is a detailed perspective view of the block which carries the cam-pin. Fig. 7 is a detailed perspective view of the block which controls the movement of the block shown in Fig. 6.

1 designates the bed of the machine, from which project the journal-boxes 2, in which is mounted the shaft 3, carrying the thread-cutting head 4.

5 designates the pulleys by which the head is rotated.

Mounted in suitable guides on the top surface of the bed of the machine is a chuck-carriage 6 for feeding the blanks to the cutting-head. This mechanism is fed back and forth in the usual way, and as it forms no part in my invention it will not be further described.

7 designates a collar which is mounted on the shaft 3 so that it can slide longitudinally of the shaft, but rotates therewith. This collar is suitably connected with the cutting-dies in the head so that when the collar is in the position shown in dotted lines in Fig. 4 the head will be closed and when the collar is moved to the position shown in dotted lines in Fig. 5 the head will be open. The patent to Adams above referred to shows a means whereby this result may be accomplished. In the particular form of mechanism by which I have illustrated my invention this collar 7 is a moving part, and in the operation of the machine it is necessary to change the locus of movement of the collar by sliding it along the shaft 3 in order to operate the head without stopping the machine. In other words, it is necessary to give this collar a rectilinear movement parallel to its axis of rotation, or, in other words, to give the collar a movement at right angles to its plane of rotation. In the form in which I illustrate my invention I accomplish this in the following manner:

8 designates a bracket which is supported by the bed of the machine and extends under the head 4.

9 is a channel cut in the top surface of the bracket 8 and extending parallel to the axis of the shaft 3. 10 is a second channel cut at right angles to the channel 9 and intersecting the channel 9.

11 is a block mounted in the channel 9 and adapted to slide therein.

12 is a block mounted in the channel 10 and adapted for movement therein transversely to the movement of the block 11. By reference to Fig. 6 it will be seen that the block 11 is of a general rectangular shape and has cut in its sides the recesses 13 14.

15 is a pin mounted in the block 11 and extending up from the block, and it is preferably provided with a reduced end, on which is carried the cam-roller 16.

17 is a cam-slot cut in the collar 7 and adapted to be engaged by the roller 16. The preferred form of this cam-slot is best shown in Figs. 4 and 5.

The channel 10, in which the block 12 is mounted, is in the form shown deeper than the channel 9, in which the block 11 is mounted, and the block 12 is provided on its upper surface with a recess 18, through which the block 11 passes. The relative positions of the blocks 11 and 12 are best seen in Fig. 2, from which it will be seen that the length of the recesses 13 14 is greater than the width of the block 12 and that the ends of these recesses overlap an amount at least equal to the width of the block 12. The width of the recess 18 in the block 12 is at least equal to the width of the block 11, so that when one end of the recess 18 is against the inner face of one of the recesses in the block 11 the other end of the recess 18 will be out of the other recess in the block 11. Consequently the block 11 may be moved a distance equal to the difference between the width of the block 12 and the length of the recess of the block 11, the direction in which this movement will be allowed being determined by whether the block 12 is in the recess 13 or 14. The difference between the width of the recess 13 or 14 and the width of the block 12 is at least equal to the throw of the cam 17, which in turn is at least equal to the movement which it is necessary to give to the collar 7 to open or close the head. The ends of the recesses 13 14 thus form stops which limit the longitudinal movement of the block 11 by striking against the projecting part of the block 12, which is in the recess.

In order to move the block 12 transversely of the block 11 to bring a projection into one and then the other of the recesses 13 14, I provide a bell-crank lever 19, which is pivoted at 20 on the bracket 8. One end of this lever extends out and forms an operating-handle 21, and the other end of the lever is provided with an opening 22, into which projects the pin 23, carried by the block 12. By means of this lever it will be seen that the block 12 may be moved transversely of the block 11. In order to hold the block 12 in either of its positions—that is to say, with a projection either in the recess 13 or the recess 14—I provide the block 12 on one side with V-shaped notches 24 and 25 and mount in a suitable bore in the bracket 8 a plunger 26, which is provided with a V-shaped end and is adapted to engage the notches 24 25, this plunger being forced toward the block by the spring 27. Preferably and as shown the adjacent sides of the V-shaped notches 24 25 come together and form an edge. Consequently the plunger 26 will always tend to force itself into one or the other of the notches and hold the block 12 in one or the other of its extreme positions.

32 is a cover which is secured to the bracket and holds the blocks in their channels. This cover is provided with a longitudinal slot 33, through which the cam-carrying pin 15 projects.

The operation of this device is as follows: It being remembered that the head, shaft, and collar revolve continuously, suppose the thread-cutting dies to be open. Then the transverse block 12 will be in the position shown in Fig. 2, and the movement of the longitudinally-moving block 11 will be limited by the stops which are formed by the ends of the recess 14 coming in contact with the sides of the projection on the block 12. The reciprocation of the block 11 is caused by the cam 17, cut in the collar 7, and since the difference between the length of the recess 14 and the width of the block 12 is at least equal to the throw of the cam 17 the collar will remain in the position shown in Fig. 5. If now the lever 19 is operated to move the transversely-sliding block 12 so that its other projection enters the recess 13 in the block 11, the movement allowed the block 11 is changed, and the rotation of the collar 7 causes the cam 17 to force the collar forward on the shaft to the position shown in Figs. 1 and 4, where it will remain, because the recess 13 will allow the block 11 to reciprocate when the collar is in this position. The movement of the collar from the position shown in Fig. 4 to the position shown in Fig. 5 causes the head to open in a manner fully described in the Adams patent above referred to.

In order to operate the mechanism for opening and closing the head automatically, I have provided a rod 28, which is mounted on the chuck-carriage and passes through an opening 29 in the lever 19. This rod carries adjustable stops 30 31, which are adapted to strike against the lever 19 and operate the same to move the block 12 from one of its positions to the other.

While I have described the preferred form of my invention, I desire to have it understood that I am not limited to the particular form, arrangement, and construction of the parts, as many changes may be made therein without departing from the spirit of my invention.

What I claim as new, and desire to secure by Letters Patent, is—

1. The combination with a movable part, of a second part connected to the first part and adapted to be vibrated thereby and stops adapted to be alternately brought into engagement with the second part to change the center of vibration of said second part whereby the locus of movement of said first part will be changed.

2. The combination with a rotatable part, of a second part connected to the first part and adapted to be vibrated thereby, and stops adapted to be alternately brought into engagement with the second part to change the center of vibration of said second part whereby the plane of rotation of said first part will be changed.

3. The combination with a movable part provided with a cam, a second part adapted to be vibrated by the cam of the first part, and means for changing the center of vibration of the second part whereby the cam will cause the first part to change its locus of movement.

4. The combination with a rotatable part provided with a cam, a second part adapted to be vibrated by the cam of the first part, and means for changing the center of vibration of the second part whereby the cam will cause the first part to change its plane of rotation.

5. The combination with a rotatable shaft, of a collar adapted to slide thereon, said collar being provided with a cam, a part adapted to be vibrated by the cam, and means for changing the center of vibration of said part whereby the cam will cause the collar to slide on the shaft.

6. The combination with a rotatable shaft, of a collar adapted to slide thereon, said collar being provided with a cam, a block, means carried by the block and engaging the cam whereby the block will be vibrated by the cam, and means for changing the center of vibration of the block whereby the cam will cause the collar to slide on the shaft.

7. The combination with a rotatable shaft, of a collar slidable thereon, said collar being provided with a cam, a part adapted to be vibrated in a path parallel to the axis of the shaft, means carried by the part and engaging the cam whereby the part will be vibrated, and means for changing the center of vibration of the part whereby the cam will cause the collar to slide on the shaft.

8. The combination with a rotatable shaft, of a collar slidable thereon, an annular cam-groove in the collar, a pin engaging the cam-groove, means for supporting the pin, and means for changing the center of vibration of the pin whereby the collar will be caused to slide on the shaft.

9. The combination with a movable part, of a second part connected thereto and adapted to be vibrated thereby, said second part being provided with stops, a third part provided with stops adapted to alternately coöperate with the stops on the second part, the stops on one of said parts being out of line with each other, whereby by changing the position of the stops on the third part, the center of vibration of the second part will be changed, said change operating to change the locus of movement of said movable part.

10. The combination with a rotatable part, of a second part connected thereto and adapted to be vibrated thereby, said second part being provided with stops, a third part provided with stops adapted to alternately coöperate with the stops on the second part, the stops on one of said parts being out of line with each other whereby by changing the position of the stops on the third part, the center of vibration of the second part will be changed, said change operating to change the plane of rotation of said rotating part.

11. The combination with a rotatable part, of a block connected thereto and adapted to be vibrated thereby, said block being provided with stops, a second block provided with stops, the stops on one of the blocks being out of line with each other, the stops on the second block being adapted to be alternately moved into engagement with the stops on the first block and change its center of vibration, said change operating to change the center of vibration of said rotating part.

12. The combination with a rotatable part, of a block connected thereto and adapted to be vibrated thereby, said block being provided with two sets of stops, the stops forming one set being out of line with the stops of the other set, a part adapted to be moved between the stops of either set, whereby the center of vibration of the block will be changed, said change operating to change the plane of rotation of the first part.

13. The combination with a rotatable shaft, a collar slidable thereon, said collar being provided with a cam, a block engaging the cam and adapted to be vibrated thereby, said block being provided with two sets of stops, the stops forming one set being out of line with the stops of the other set, a part adapted to be moved between the stops of either set whereby the center of vibration of the block will be changed, said change operating through the cam to change the plane of rotation of said collar.

14. The combination with a rotatable shaft, of a collar slidable thereon, said collar being provided with a cam, a block engaging the cam and adapted to be reciprocated thereby, said block being provided with recesses in its sides, the ends of said recesses forming stops, the recesses being out of line with each other, a part adapted to be moved into either recess whereby the center of vibration of the block will be changed, said change operating to slide the collar on its shaft.

15. The combination with a rotatable shaft, of a collar adapted to slide thereon, said collar being provided with a cam, a block, means carried by the block and engaging the cam whereby the block will be reciprocated by the cam, said block being provided with recesses in its sides and out of line with each other, a second block provided with projections and mounted to move transversely of the first block whereby a projection may be moved into either recess to change the center of vibration of the first block and cause the cam to slide on its shaft.

16. In a thread-cutting machine, the combination with a rotatable shaft, a thread-cutting head carried by the shaft and having movable dies, a collar slidably mounted upon the shaft and means carried by the collar to operate the dies, a cam-groove cut in the periphery of the collar, a part constantly engaging the cam-groove and adapted to be vibrated thereby and means for changing the center of vibration of the vibrating part, whereby the cam will be slid on the shaft and the dies in the head be operated.

17. In a thread-cutting machine, the combination with a rotatable shaft, a cutting-head carried by the shaft and having movable thread-cutting dies, a collar slidably mounted upon the shaft and means carried by the collar to operate the dies, a carriage adapted to carry the work and feed the same to the head, a cam-groove cut in the periphery of the collar, a part constantly in engagement with the cam-groove and adapted to be vibrated thereby, and means operated by the movement of the carriage to change the center of vibration of the vibrating part to slide the cam on its shaft and operate the dies in the head.

Signed by me at Baltimore, State of Maryland.

FRANCIS H. EASBY.

Witnesses:
ARMSTEAD M. WEBB,
FRANCIS M. PHELPS.